(No Model.) 4 Sheets—Sheet 1.

B. A. DOBSON & W. I. BROMILEY.
CARDING ENGINE.

No. 466,846. Patented Jan. 12, 1892.

Witnesses:
E. B. Bolton
H. de Vos

Inventors:
Benjamin Alfred Dobson
William Isherwood Bromiley
By Richards & Co.
their Attorneys.

(No Model.) 4 Sheets—Sheet 2.

B. A. DOBSON & W. I. BROMILEY.
CARDING ENGINE.

No. 466,846. Patented Jan. 12, 1892.

Witnesses:
E. B. Bolton
H. de Vos.

Inventors:
Benjamin Alfred Dobson
William Isherwood Bromiley
By Richards & Co.
their Attorneys.

(No Model.) 4 Sheets—Sheet 3.

B. A. DOBSON & W. I. BROMILEY.
CARDING ENGINE.

No. 466,846. Patented Jan. 12, 1892.

Witnesses:
E. B. Bolton
H. deVos

Inventors:
Benjamin Alfred Dobson
William Isherwood Bromiley
By Richards
his Attorneys.

THE NORRIS PETERS CO., PHOTO-LITHO., WASHINGTON, D. C.

(No Model.) 4 Sheets—Sheet 4.
B. A. DOBSON & W. I. BROMILEY.
CARDING ENGINE.
No. 466,846. Patented Jan. 12, 1892.
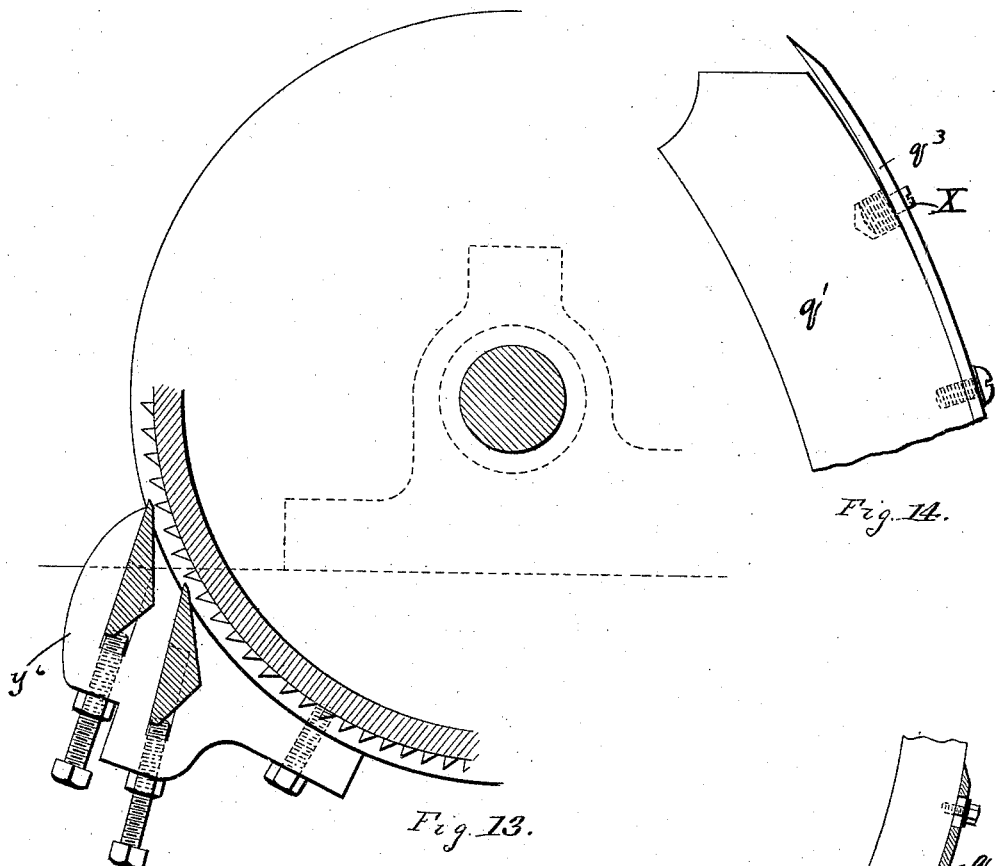
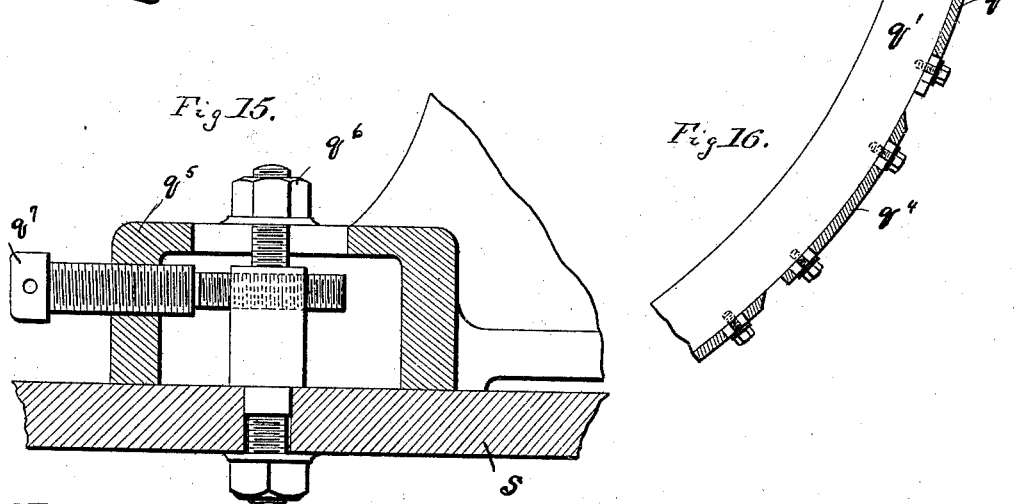

UNITED STATES PATENT OFFICE.

BENJAMIN ALF. DOBSON AND WILLIAM ISHERWOOD BROMILEY, OF BOLTON, ENGLAND, ASSIGNORS TO DOBSON & BARLOW, OF SAME PLACE.

CARDING-ENGINE.

SPECIFICATION forming part of Letters Patent No. 466,846, dated January 12, 1892.

Application filed November 5, 1889. Serial No. 329,322. (No model.) Patented in England December 21, 1888, No. 18,668; in France October 9, 1889, No. 201,217, and in Switzerland October 28, 1889, No. 1,559.

*To all whom it may concern:*

Be it known that we, BENJAMIN ALFRED DOBSON and WILLIAM ISHERWOOD BROMILEY, both subjects of the Queen of Great Britain, residing at Bolton, in the county of Lancaster, England, have invented certain new and useful Improvements in Carding-Engines, (for which we have obtained Letters Patent in Great Britain bearing date December 21, 1888, No. 18,668; in France October 9, 1889, No. 201,217, and in Switzerland October 28, 1889, No. 1,559,) of which the following is a specification.

Our improvement relates to carding-engines for cotton and other fibrous materials; and it consists in certain arrangements for combining and setting the front and back covers, under-casings, and knives of carding-engines, and also in an improved construction of the front portion of the under-casing; and in order that our invention may be fully understood and readily carried into effect we will describe the accompanying three sheets of drawings, reference being had to the letters marked thereon.

Figure 1:
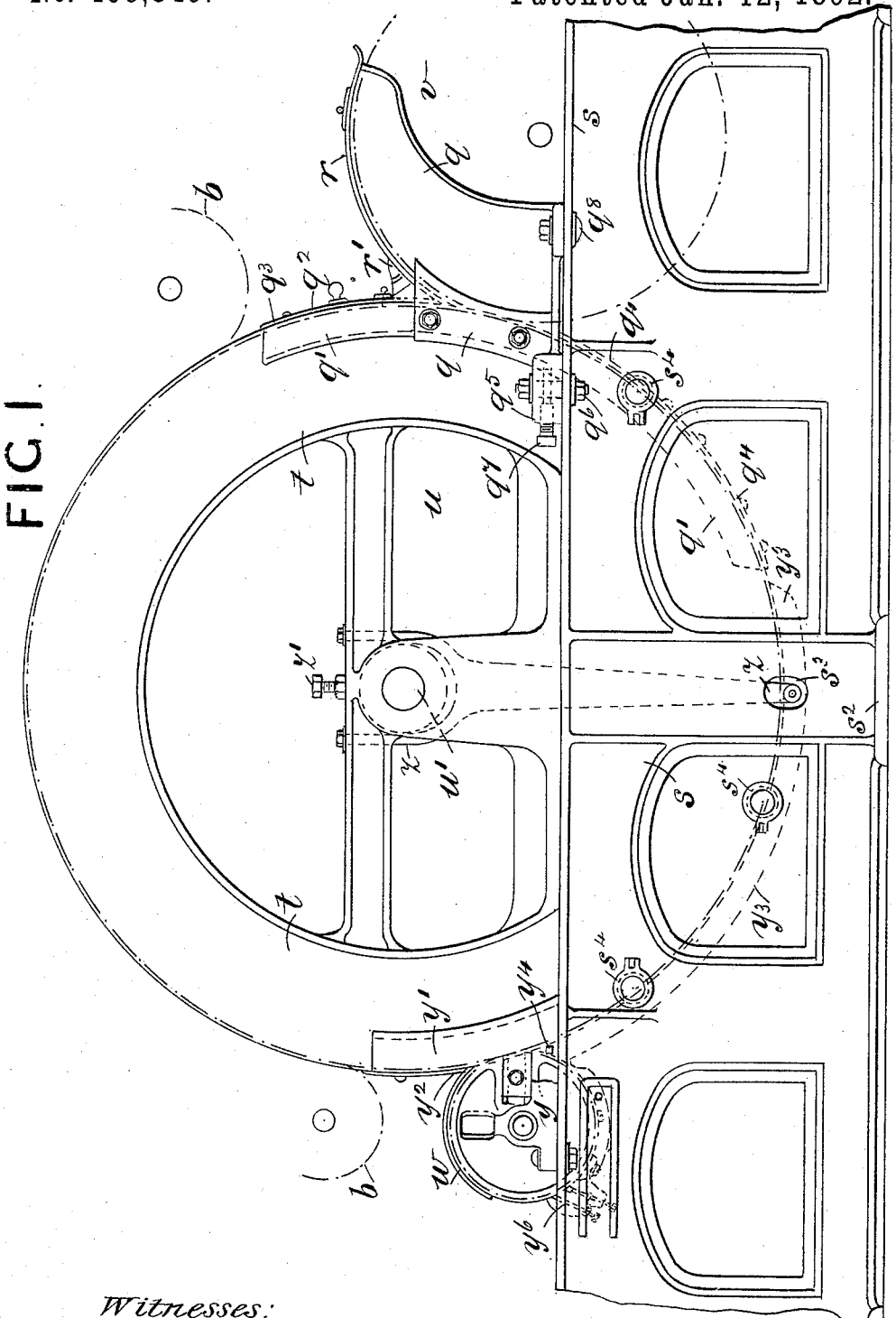

Figure 1 is a side elevation of a carding-engine, showing only those parts necessary for the proper illustration of our improvements; and Figs. 2 to 12 are detail views, on an enlarged scale, illustrating the application of our invention to the setting and construction of the several covers and casings. Figs. 13, 14, 15, and 16 are also detail views of portions of our apparatus, showing more clearly the front fly-plate, the blades, the setting apparatus, and the back knives.

Similar letters refer to similar parts throughout the several views.

We have on each side of the carding-engine a strong movable framing $q$, which carries the doffer-cover $r$, and this movable framing $q$ on each side of the carding-engine is fitted to slide along a planed or prepared surface on the under-framing $s$. This movable framing $q$ is formed in one piece with or has attached to it a turned segment $q'$, the upper part of which supports the ordinary door or lap-piece $q^2$ and fits into a recess formed to receive it in the engine-bend $t$. To this upper part $q^2$ is secured the front fly-plate $q^3$—i. e., a steel or other plate which forms a knife between the cylinder $u$ and flats $b$ in the front. The aforesaid segmental piece $q'$ is also preferably continued below the level of the top flange of the under-framing $s$ of the carding-engine and is utilized to support the improved portion of the under-casing hereinafter described or any ordinary under-casing.

In our improved under-casing we have for a certain distance from the point where the cylinder $u$ and doffer $v$ are nearest and on the under side a steel or other blade or blades $q^4$, each made in one or more pieces and concentric with the wire surface of the main cylinder $u$ and carried down for a certain distance, the whole being firmly fixed to the above-named segmental part $q'$.

It will be evident from the foregoing description that if the several parts be constructed and arranged as described from one setting-point on each side of the carding-engine the position of the whole movable framing $q$ and the parts $q'$ $q^2$, the fly-plate $q^3$, and under-casing blade $q^4$, with the doffer-cover $r$ and making-up piece $r'$, may be all simultaneously adjusted.

Our improved form of setting apparatus above referred to, which may also be used for the adjustment of the pedestals of the doffer $v$ and licker-in $w$ or for the adjustment of other parts, may be constructed in the following way: We prolong the base of the sliding frame $q$ a sufficient distance and cast a hollow box or recess $q^5$ in such prolonged portion. There is an eyebolt $q^6$, securing the box $q^5$ to the under-framing $s$, and a differential adjusting-screw $q^7$, which is tapped through the end of the box or recess $q^5$ and is also screwed through the eyebolt $q^6$, so that by turning the screw $q^7$ the whole sliding frame $q$, with the various parts secured to or supported thereon, can be moved and adjusted simultaneously, as above mentioned. We may also have a holding-down bolt or bolts, such as $q^8$, the whole arrangement insuring a very accurate, firm, and safe adjustment.

Figure 4:
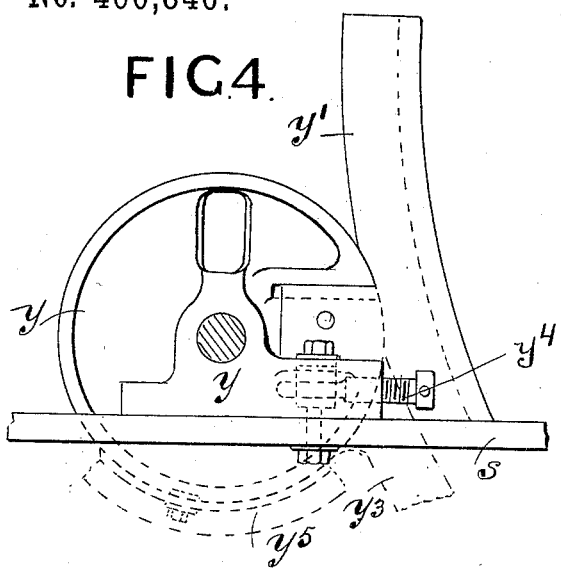
Figure 5:
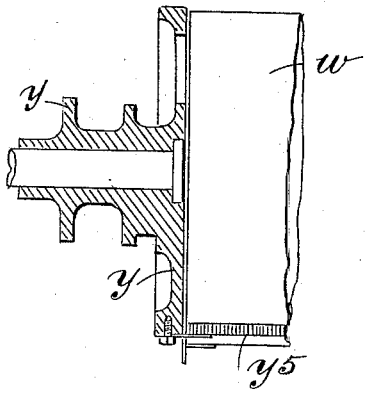
Figure 2:
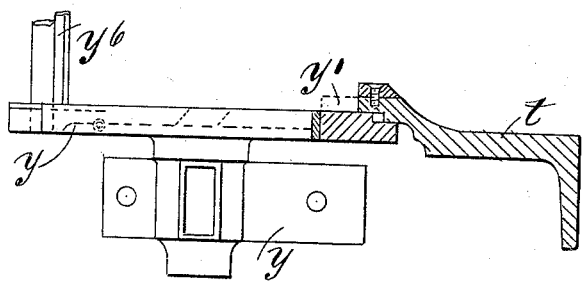

In applying our improved setting apparatus to the pedestals of the doffer $v$ or licker-in $w$ we prolong the base of each of said pedestals and cast the aforesaid hollow box in such prolonged portion, as shown applied to the licker-in pedestal, Fig. 4.

Figure 7:
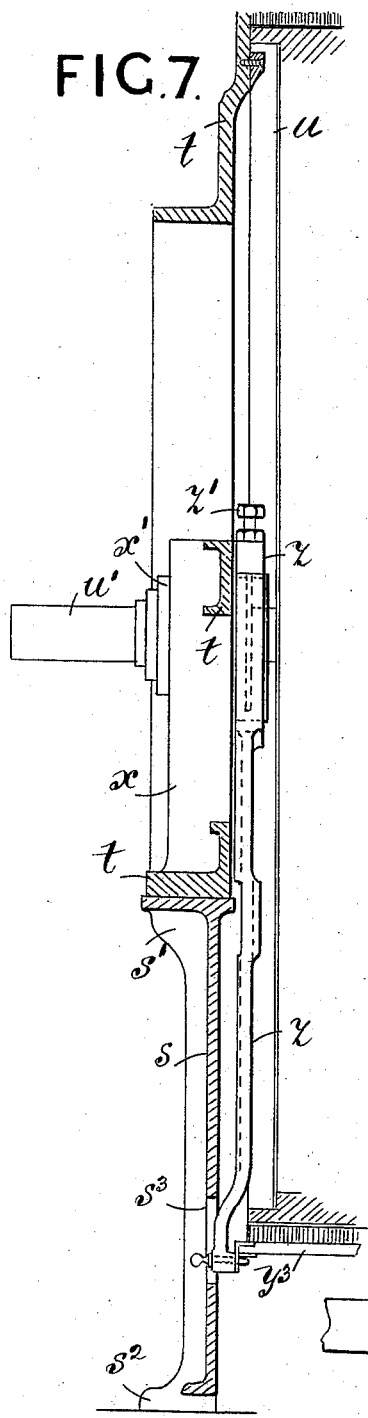

We recess the ends of the cylinder $u$, as shown in Fig. 7, by placing the rings and end plates thereof a certain distance back from the edge of the cylinder in the usual known manner, leaving the body of the bend $t$ outside the cylinder, and continue the bearing or socket $x'$ of the cylinder-pedestal $x$ for a short distance, so that the said bearing or socket $x'$ projects equally, or nearly so, on each side of the body of the under-framing $s$, whereby the pressure of the weight of the cylinder $u$ is brought over a point at the mid-width of the framing. We may further make provision for strengthening the said framing $s$ to sustain the weight of the cylinder $u$ by carrying down webs or feathers $s'$ from the upper flange of the main framing $s$ to a strong foot or feet $s^2$, formed on the said framing to rest upon the floor.

Figure 6:
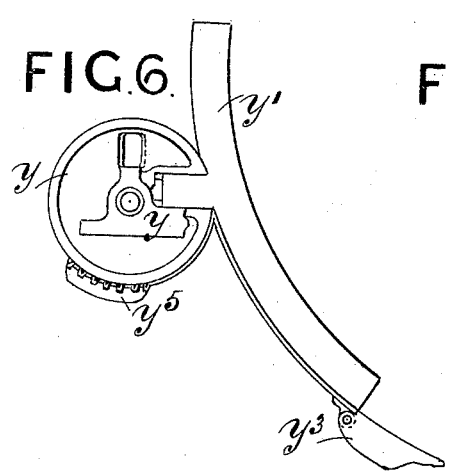
Figure 3:
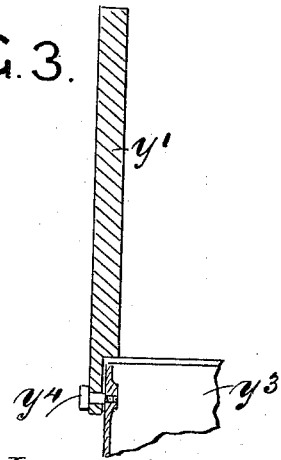

We apply our improvements also to the setting and construction of the under-casing of the main cylinder $u$ and licker-in $w$, and also to what are termed the "back knives" $y^2$, which cover that portion of the cylinder $u$ between the licker-in and flats, and the other back knives $y^6$, which are attached to the licker-in pedestals $y$. Thus we may have a pedestal or sliding frame $y$, supporting a segmental piece $y'$, upon which are screwed the said back knives $y^2$. By screws $y^4$ the back end of the under-casing $y^3$ or the segmental piece $y'$ may be secured so as to extend below the underframing $s$ and the back end of the under-casing $y^3$ hinged or otherwise attached thereto, as shown in Fig. 6. This frame $y$, with the under-casing $y^5$ of the licker-in, the casings $y'$ $y^3$, and the back knives $y^2$ $y^6$, are adjusted by means of the improved setting apparatus hereinbefore described, and shown applied to the licker-in pedestals $y$ in Fig. 4. As far as the combined adjustment which affects both the licker-in and the under-casing is concerned, there is no difference between having the back end of the casing secured by screws to piece $y'$ and having said back end hinged to said piece; but it is obvious that there will be a difference when the setting of the front end of the under-casing is effected by means of the swinging bracket $z$ or its equivalent. As in the case of the screws, the back of the end of the under-casing is rigidly attached to the piece $y'$, and in the second case it is hinged to the said piece. We might employ any ordinary adjusting appliances; but we prefer to employ our improved adjusting device, as shown and described, as our object is to simplify the operation of adjusting and enable the parts of this portion of the carding-engine to be set with the greatest accuracy. It will thus be seen that applicants have one adjustment which affects both the licker-in and under-casings.

We prefer to adjust the central part or front end of the under-casing $y^3$ and test the adjustment of that and of the other parts in the following manner: The back end of the under-casing, having been already adjusted by the setting of the licker-in pedestals and sliding frame $y$, is held firmly by said frame, and the inside surface of the under-casing $y^3$, as originally set, is exactly concentric with the outside surface of the wire and the cylinder $u$. When this wire has worn and when all the various parts are adjusted, as previously described, to keep them as nearly as possible the same relative distance from the working parts, it becomes desirable to adjust, also, the central part or front end of the under-casing $y^3$. The front end of the said under-casing $y^3$ is according to our improvements carried on each side of the carding-engine by a strong hanging bracket $z$ from the boss or socket $x'$, which carries the bearing for the cylinder-shaft $u'$, around which the said hanging bracket $z$ may move when the under-casing $y^3$ is adjusted with the other parts by the setting apparatus. The front end or central portion of the under-casing $y^3$ may approach within a short distance of the metal blade $q^4$, which is attached to the front under-casing $q'$, near the under-casing $y^3$, and moves with the sliding frame $q$; and we may have a hole or opening $s^3$ in some portion of the underframing $s$, that will permit a gage to be passed between the under-casing $y^3$ and the wire of the cylinder $u$, so that if the space becomes too great, which is easily observable, the hanging bracket $z$ on each side of the engine, which is provided with an adjusting-screw $z'$, can be made therewith to raise or adjust the front end of the under-casing $y^3$ to the required position; or we may employ either of the devices shown in Figs. 8 to 12 in order to support and guide the front end and central portion of the under-casing $y^3$ when the latter is adjusted.

Figure 8:
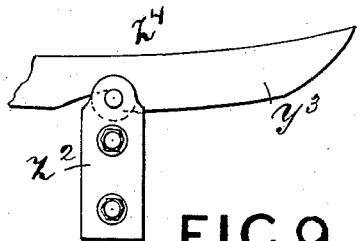
Figure 9:
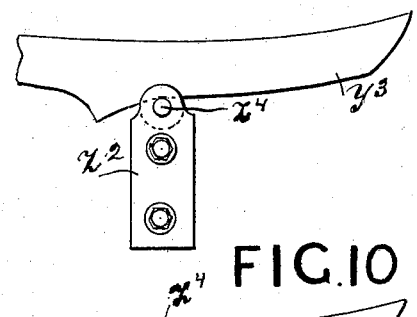
Figure 10:
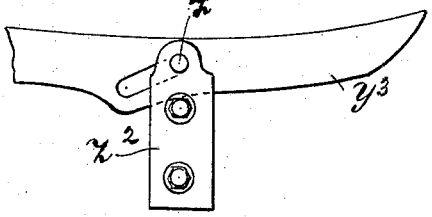

The devices shown in Figs. 8, 9, and 10 consist of stationary brackets $z^2$, bolted to the under-framing $s$ and carrying studs $z^4$, preferably provided with anti-friction bowls, upon which the prepared inclined or slotted surface of the under-casing $y^3$ moves when adjusted. In Fig. 8 the inclined surface is made by notching the under-casing $y^3$. In Fig. 9 it is made by forming a projection on $y^3$, and in Fig. 10 it is made by forming a diagonal slot in $y^3$, the action in each case being the same, as when the under-casing $y^3$ is moved endwise the inclined surface, moving on the studs carried by the brackets $z$, causes the under-casing $y^3$ to be adjusted relative to the cylinder.

Figure 11:
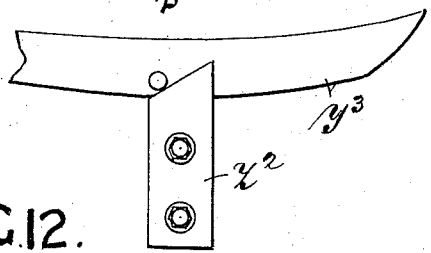

In Fig. 11 the stud $z^4$ is on the under-casing $y^3$ and the prepared surface on the bracket $z^2$.

Figure 12:
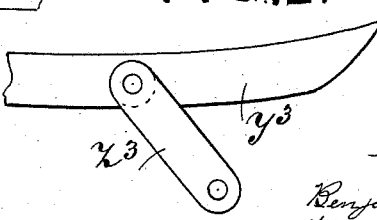

In Fig. 12 the under-casing $y^3$ is shown simply connected to the under-framing by a pivoted link $z^3$, which would support the under-casing $y^3$ and guide it during adjustment.

For the purpose of testing the adjustment of the various covers and casings we form bosses $s^4$ upon the framing opposite the circumference of the wire of the working parts. Each of these bosses $s^4$ is bored out and fitted with a cover, which may be screwed in or fastened by a set-screw or hinged to the framing, as shown. When the setting requires to be adjusted, the covers are removed or swung back on their hinges and a thin gage passed through one of the holes and between the wire and the working parts, and when the adjustment has been effected the stop-pieces or covers are replaced. We do not limit ourselves to the position or number of these.

Having now particularly described and ascertained the nature of our said invention and in what manner the same is to be performed, we declare that what we claim, and desire to secure by Letters Patent of the United States, is—

1. The combination, with the bend-nose or side framing $q$ of the doffer, under-framing $s$, and segmental piece $q'$, forming part of side framing $q$ and extending upward on each side of the engine, of means for simultaneously adjusting the above-mentioned parts, substantially as set forth.

2. The combination, with the bend-nose $q$, under-framing $s$, and segmental piece $q'$, forming part of the bend-nose and extending above and below the under-framing on each side of the engine and carrying the under casing or casings between the main cylinder and doffer, of means for simultaneously adjusting the above-mentioned parts, substantially as herein set forth.

3. The combination consisting of the movable frame $q$, segmental piece or pieces $q'$, door or lap pieces $q^2$, front fly-plate $q^3$, the metal under-casing or blades $q^4$, the hollow box $q^5$, and setting devices, one on each side of the engine, substantially as set forth.

4. The combination, with the licker-in pedestals $y$, under-framing $s$, and a segmental piece $y'$ above the under-framing on each side of the engine, said segmental piece carrying the back knives $y^2$, of means for adjusting the whole simultaneously, substantially as specified.

5. The combination, with the licker-in pedestals $y$ and under-casing $y^5$, under-framing $s$, cylinder under-casing $y^3$, and a segmental piece $y'$ on each side of the engine, said piece above the under-framing carrying the back knives $y^2$ and below supporting the cylinder under-casing $y^3$, of means for adjusting the above-mentioned parts simultaneously, substantially as specified.

6. The combination, with the main cylinder and an under-casing therefor, of the hanging bracket $z$, provided with an adjusting-screw $z'$, whereby the front end of the under-casing can be raised and adjusted to the desired position, substantially as set forth.

7. The combination, with an under-casing $y^3$ for the main cylinder, adjustable with the pedestals of the licker-in, of means for supporting and guiding the front end of the under-casing $y^3$ when the latter is adjusted, substantially as set forth.

In testimony that we claim the foregoing as our invention we have signed our names, in presence of two witnesses, this 21st day of October, 1889.

BEN. ALF. DOBSON.
WILLIAM ISHERWOOD BROMLEY.

Witnesses:
  SAMUEL BROMLEY,
    165 *Clarence Street, Bolton.*
  PERCY EDWARD HASLAM,
    200 *Blackburn Road, Bolton.*